July 19, 1960 R. W. AVERY ET AL 2,945,457
RAIL VEHICLE SUSPENSION CABLE
Filed Oct. 1, 1956
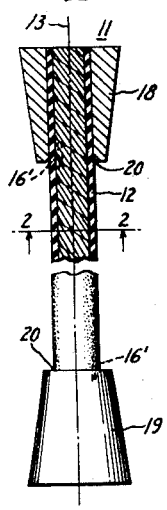
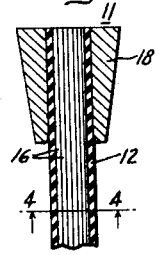
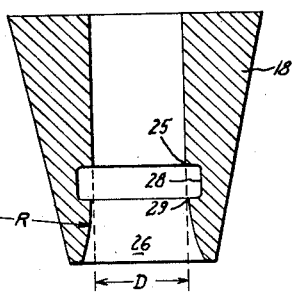
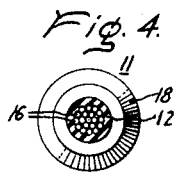
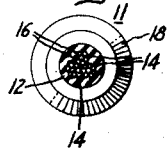
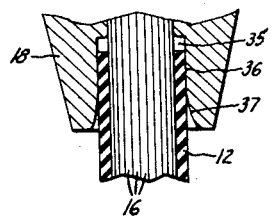
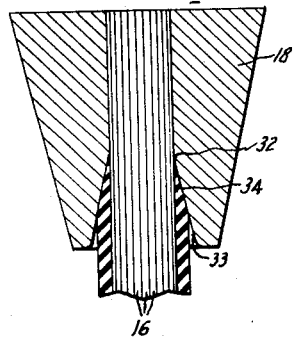
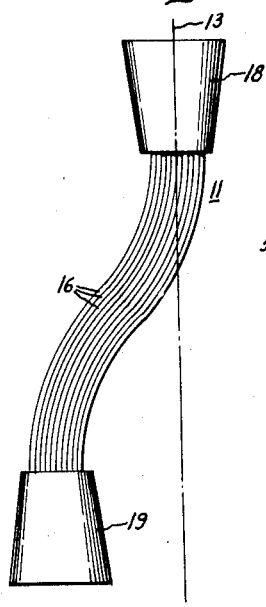
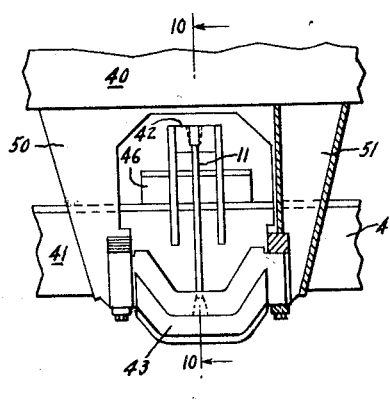
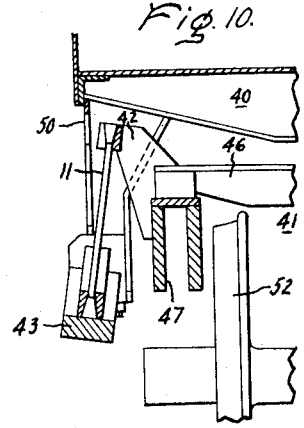
Inventors:
Ralph W. Avery,
Fred B. Schneider,
by David P. Ogden
Their Attorney.

United States Patent Office 2,945,457
Patented July 19, 1960

2,945,457
RAIL VEHICLE SUSPENSION CABLE

Ralph W. Avery, Erie, and Fred B. Schneider, Wesleyville, Pa., assignors to General Electric Company, a corporation of New York Filed Oct. 1, 1956, Ser. No. 613,072

3 Claims. (Cl. 105—199)

Our invention relates to rubber clad wire ropes and more particularly to wire ropes of a relatively short length adapted to support a body of a rail vehicle on the truck.

In many of its aspects, this invention is an improvement over the Patent 2,706,453, issued to F. B. Schneider, April 19, 1955, and assigned to the assignee of this application.

In the construction of rail vehicles, it has been the conventional practice to support the body of the vehicle on a center plate formed on the truck frame. This arrangement both supports the cab and permits the truck to pivot with respect to the cab, thereby allowing the rail vehicle to negotiate curves of the rail without damaging the support. However, in the case of a vehicle having three or more trucks, a curve will displace the trucks laterally relative to the longitudinal center line of the vehicle. Since the end trucks move toward the center of curvature and the center trucks move in the opposite direction, it is essential to provide for this lateral displacement. In the past, this combination of swivel and transverse motion between the trucks and the supported rail vehicle body has required the use of rather complicated mounting arrangements involving sliding connections between the ends of the truck and the body and a separate swing bolster which is suspended from the truck by hangers to permit transverse motion of the bolster. A center plate connection to the body from the bolster permits the swivel motion.

In the above mentioned patent, the use of stranded cables between the truck frame and the rail vehicle body has allowed the support of the vehicle body from the truck to be flexible enough to provide a support which will allow both swivel and lateral movement in a very simple manner. However, it has been found that the conventional, stranded, woven or braided cable has individual wires subjected to severe stresses within the cable and especially severe stress concentration at the connections at the ends of the cable.

It has also been found that the flexing of these cables will cause friction between the wires within the cable and erode the metal. Also, the cable will tend to oxidize in the open air more readily than metal parts which are not flexed or abraded. This is especially true in tropical climates which have high humidity a large portion of the time.

Therefore, an object of our invention is to provide a simple and reliable stranded cable which will overcome the above mentioned problems.

A further object is to provide a simple and reliable rail vehicle construction wherein the body of the vehicle is supported on a truck without the use of a center plate and without the use of a sliding surface.

In accordance with one embodiment of our invention, a stranded cable is connected between terminal members which move transversely with respect to each other. The cable is designed to prevent stress concentrations in any one wire and is protected by an insulating coating from the oxidizing effects and erosion which are stimulated by the flexing of the metal in the cable. Also, the terminal means of the cable are especially adapted to prevent concentration of stresses at the connection of the cable to the terminus. These cables are particularly adapted to support a locomotive body from a truck.

The subject matter which we regard as our invention is particularly pointed out and distinctly claimed in the concluding portion of this specification. Our invention, however, both as to organization and method of operation together with further objects and advantages thereof, may best be understood by reference to the following description taken in connection with the accompanying drawing, in which:

Fig. 1 is a detail view, partially in section, of a cable hanger arranged in accordance with our invention;

Fig. 2 is a cross-sectional view of the cable of Fig. 1 taken along the line 2—2;

Fig. 3 is a sectional view of a modification of a cable construction in accordance with our invention;

Fig. 4 is a sectional view of the cable of Fig. 3 taken along the line 4—4;

Fig. 5 is a detail view of the cable supporting member illustrating further modifications of our invention;

Fig. 6 is a detail view of the supporting member illustrating another embodiment of our invention;

Fig. 7 is a detail view of the supporting member illustrating another embodiment of our invention;

Fig. 8 is a view of a cable distorted under load;

Fig. 9 is a fragmentary side elevation view, partially in section, illustrating an improved rail vehicle body supporting arrangement of our invention; and Fig. 10 is a fragmentary view taken along the line 10—10 of Fig. 9.

Referring now to the drawing in which like numerals identify like parts, we have shown a stranded cable 11 which is clad in a molded plastic such as a rubber sheathing 12 being flexible so that one end thereof may be displaced laterally relative to the center line 13. In Fig. 1, the cable is shown as a conventional wire rope having braided strands 14. Three woven cable strands 14 are shown in Fig. 2 with each of the strands 14 consisting of individual wire filaments 16 which run for considerable length in the cable. Generally, for the length of cable we contemplate using in our invention, the wire filaments 16 will run the entire length of the cable 11.

The addition of the rubber sheathing 12 which covers the outer surface of the cable 11 provides a three-fold improvement. First, it protects the body of the cable 11 from the elements to reduce rust or corrosion of the wire filaments 16. Also, it provides a cushion between the cable 11 and the terminal sleeves 18 and 19 to prevent cutting of the cable by the edges 20 of the terminal sleeves. Perhaps the most important function of the rubber is not its use as the outer sheathing, but the fact that the rubber is forced into the cable to function as a lubricant between the individual wire filaments 16 (Figs. 2 and 4). This function will substantially reduce and in many cases prevent the erosion caused by the abrading action of adjacent wire filaments.

We have found that with relatively short cables such as the one shown in Fig. 8, the wire filaments 16 of a twisted strand type cable (Fig. 1) will invariably be tensioned a differing amount if the loaded cable 11 is subjected to severe misalignment between the sleeves 18 and 19. It is obvious from Fig. 1 that if a wire filament 16' were clamped at the top of the cable on the left hand side of the cable by the upper sleeve 18 and clamped at the bottom of the cable on the right hand side of the lower sleeve 19, a lateral motion of the upper sleeve 18 to the left relative to the lower sleeve 19 would cause this particular wire filament 16' to be tensioned more than the other wire filaments 16. If the cable were normally loaded, this arrangement will cause the wire filament 16' to be stretched beyond its elastic limit. A similar movement of the upper sleeve 18 to the right would cause a wire filament clamped diametrically opposed in relationship to the first fiber to be stretched beyond its elastic limit. This action has been found to elongate these wire filaments as much as twenty-thousandths of an inch or more.

Obviously, when the cable is again positioned as shown in Fig. 1 with the sleeves 18 and 19 in alignment, these two elongated wire filaments will not carry as much load as unstretched wire filaments 16 in the cable. Repeated action of this type, where the misalignment of the sleeves 18 and 19 is sufficient to cause elongation of the cable wire filaments 16, will from time to time stretch one or another of the wire filaments of the braided wire rope, causing the elongated wire filaments to be unloaded under normal alignment and loading. As this action continues, more and more of the wire filaments will become elongated and unloaded until finally the unstretched wires will be loaded beyond their elastic limit. At this time, these wires will elongate enough to place some of the load on the already elongated wire filaments. After all of the wire filaments 16 have been stretched, a severe lateral displacement of the upper sleeve 18 relative to the lower sleeve 19 will again stretch one of the first wire filaments and the action will be repeated until the cable 11 is broken. It has been found that as few as 50,000 lateral displacements under normal loading of the uncoated, twisted cables will break the cables because of this stretching of the individual filaments.

However, it should be noted that the use of the flexible rubber covering 12 greatly increases the life of these supporting cables 11 by distributing the clamping action of the sleeves 18 and 19 so that individual wire filaments 16 are somewhat cushioned and stretching thereof is materially reduced. Such a rubber sheathing on the cable will more than double the allowable number of lateral displacements at the normal loading.

We have found that having the individual filaments of the wire rope positioned in parallel arrangement or an unwoven bundle, as shown in Figs. 3, 6, 7 and 8, will allow misalignment of the sleeves 18 and 19 without materially increasing the tension in any one of the wire filaments 16. As long as the sleeves 18 and 19 remain in a vertical position parallel to the center line 13 of the cable 11, individual wires will be bent but not stretched when we use the parallel wire filaments 16 depicted in Figs. 3, 6, 7 and 8. As shown in the cross-sectional view shown in Fig. 4, we prefer that these individual strands are not woven in any way.

With this parallel arrangement, the rubber sheathing 12 covering the wires 16 provides an additional function of preventing the strands from becoming tangled or separated. The problem of the individual strands being tangled or bent upon themselves has been one of the primary reasons for the usual practice of weaving or braiding the wire ropes.

In Fig. 5, we have shown a detail view of an improved sleeve 18. In order to reduce to a minimum the stress concentration at a lowest edge 25 where the cable is clamped, we have added an extension to the sleeve 18 downward from the point 25 to provide a bell mouth opening 26. The cable 11 is clamped in a region above the edge 25. We prefer to have a radius R of approximately four times the diameter D of the cable 11 provided at the aperture of the bell mouth opening 26 to prevent sharp bending of the cable 11 at the edge 25 of its support.

Also, in Fig. 5, we have shown an annular stress relief groove 28 surrounding the cable 11 directly below the lowest support edge 25. The upper edge 29 of the bell mouth 26 is slightly larger than the lower edge 25 of the sleeve 18, but fits the cable 11 closely enough to prevent any substantial lateral displacement within the region of the stress relief groove 28. This arrangement prevents the cable bending about the sharp corners of the edge 25 which bending would tend to severely concentrate stresses in and weaken the periphery of the cable 11. We have found that preventing the bending of the cable in this manner and adding the bell mouth having the relatively large radius of curvature will more than double the life of cables of this type.

In Fig. 6, we have shown another modification of the sleeve 18 for relieving the stress concentration of the cable. In the clamping region, the rubber sheathing 12 is removed and the cable 11 is supported by direct metal contact with the sleeve 18. However, in order to prevent the sharp bending of the lower edge 32 supporting the cable 11, we have provided a tapered lower extension 33 on the sleeve shown. We prefer that the rubber sheathing 12 be machined or stripped from the cable so that a mating taper 34 is provided to cushion the cable below the lowest supporting edge 32. Obviously, in some cases it would be best to mold the rubber on the cable 11 after the sleeve 18 has been clamped in place, to insure proper mating and bonding between the inner surface of the extension 33 and the surface of the taper 34.

In Fig. 7, we have shown that a stress relief can also be accomplished by having a recess 35 similar to that shown at 28 in Fig. 5. Flexing of the cable 11 at the lowest support edge of the sleeve is prevented by compressing the rubber sheathing 12 slightly in the extension inner surface 36. The pressure in the region 36 should be insufficient to support the cable 11 but sufficient to prevent any substantial lateral displacement of the cable between the surface 36 and the recess 35. We also prefer to use a bell mouth arrangement 37 in this sleeve extension.

In Figs. 9 and 10, we have shown a rail vehicle body 40 arranged over a truck 41. In order to support the body 40 on the truck 41 while allowing limited swivel and transverse motion of the truck with respect to the body, one of the cables 11 is connected to a support member or hanger 42 arranged on the truck 41 above a hanger member 43 which is secured to the body 40. The support member 42 may be mounted on a cross member 46 of the truck or may be mounted directly on a side member 47 of the truck. It should be noted with the cable hanger of this type, it is not essential to have a center plate sliding support, or to have a special bolster member for mounting the cable 11.

However, it is essential that the cable 11 be under tension. Therefore, the support member 42 on the truck 41 must be above the hanger member 43 on the body 40 despite the fact that the body 40 itself is above the truck 41. In order to accomplish this, we have provided downwardly extending legs 50 and 51 which maintain the hanger member 43 below the body 40 of the vehicle to allow compression in the legs 50 and 51 and tension in the cable 11 to support the body 40.

Also, we have found from experience with these cables 11 that if a plurality of cables is used, on one side of the truck, with a truck subjected to swivel, transverse, and various rocking motions, it occurs from time to time that all of the load is carried momentarily by one of the plurality of cables. Therefore, in order to prevent elongation, it is essential that each of the plurality of cables be stronger than a single cable would have to be. This is because of the fact that the transfer of the load from one cable to another causes a shock loading that is not likely to occur if a single cable is used. In other words, a single cable is not likely to be unloaded so that the load may be transferred to it. It is a well known phenomenon that a shock loading created by a weight adjacent to a horizontal surface and from there dropped or released will create twice the load that it will have if its weight is slowly transferred to the surface. Thus, it is readily apparent that each of the cables in a multiple cable system should be at least twice as strong as static loading would indicate.

In our present arrangement, the forward and back tilting of the truck which often occurs, particularly in humping operations, will not unload either of the cables 11. Therefore, the shock loading encountered with the multiple cable system is not likely to occur unless the locomotive truck 41 and a wheel 52 should bounce clear of the rail. Generally the rail conditions are not such that a vehicle is driven over it fast enough to bounce the wheel 52 clear of the rail. Thus, shock loading is less likely to occur with a single cable 11 than it is with a multiple cable system.

The flexibility of the cable 11 permits the truck, including the support member 42, to both pivot and move laterally or transversely with respect to the body 40 including the hanger member 43. It should be also noted that this arrangement has eliminated all requirements for lubrication of sliding surfaces between the truck and the body 40.

We prefer that the cable 11 be inclined outwardly as well as downwardly from the truck 41 to dampen swinging motion of the body 40 with respect to the truck, and to tend to swing the body 40 of the vehicle toward the center of curvature.

While we have shown and described particular embodiments of this invention, further modifications and other uses will occur to those skilled in the art. For instance, while two downwardly projecting legs 50 and 51 have been shown, it is readily apparent that a single leg can be used if sufficient clearance is provided to prevent the one leg from interfering with the hanger support member 42. We desire it to be understood, therefore, that this invention is not limited to the form shown, and we intend by the appended claims to cover all such modifications which do not depart from the true spirit and scope of our invention.

What we claim as new and desire to secure by Letters Patent of the United States is:

1. A wire rope assembly comprising a plurality of wire filaments, a terminal sleeve secured to the upper end of the rope, an extension below the sleeve surrounding the filaments, and an annular restriction in the extension limiting the lateral displacement of the filaments for a predetermined length to prevent stress concentration at a lower clamping edge of the sleeve, the extension being flared below said predetermined length to facilitate lateral displacement of the filaments below the restriction whereby bending of the filaments is limited by the flared portion, the extension being provided with an annular recess between the sleeve and the restriction wherein the filaments are neither clamped nor restricted.

2. For use in supporting a rail vehicle body over a truck while allowing both limited pivotal and transverse motion of the truck relative to the body, a flexible multiple wire filament cable, terminal sleeves attached to each end of said cable adapted to support said cable in tension between the vehicle body and truck, an extension on each of said terminal sleeves surrounding the cable and extending toward the other terminal sleeve, said extension being flared beyond a predetermined length to facilitate graduated lateral displacement of the filaments therebeyond whereby any bending of the cable is limited by the flared portion to reduce stress concentrations at the end of the sleeves, and a resilient material forming a sheath around the filaments and interspersed between the filaments to protect the cable against corrosion and to act as a permanent lubricant for the filaments to minimize the abrading action of adjacent filaments.

3. For use in supporting a rail vehicle body over a truck while allowing both limited pivotal and transverse motion of the truck relative to the body, a wire rope assembly comprising a plurality of wire filaments, a terminal sleeve secured to the upper end of the wire rope adapted to secure said wire rope to the rail vehicle, an extension below the sleeve surrounding the filaments, said extension being flared to control graduated lateral displacement of the filaments below the sleeve whereby bending of the filaments is limited by the flared portion, a rubber sheathing surrounding the wire filaments to insulate the filaments from a corrosive atmosphere, said rubber sheathing also extending between said extension and the rope assembly so as to cushion said bundle within said extension.

References Cited in the file of this patent

UNITED STATES PATENTS

| | | |
|---|---|---|
| 170,266 | Hoogeveen | Nov. 23, 1875 |
| 472,643 | Patterson | Apr. 12, 1892 |
| 818,604 | Bierd | Apr. 24, 1906 |
| 1,702,130 | Pipes | Feb. 12, 1929 |
| 2,222,609 | Everett | Nov. 26, 1940 |
| 2,675,420 | Yeager | Apr. 13, 1954 |
| 2,706,453 | Schneider | Apr. 19, 1955 |
| 2,749,261 | Hardison | June 5, 1956 |
| 2,761,893 | Morrison | Sept. 4, 1956 |
| 2,782,251 | Ebel et al. | Feb. 19, 1957 |